UNITED STATES PATENT OFFICE.

GEORGE M. JAQUES, OF BOSTON, MASSACHUSETTS.

IMPROVED COMPOSITION FOR DESTROYING INSECTS.

Specification forming part of Letters Patent No. 58,423, dated October 2, 1866.

*To all whom it may concern:*

Be it known that I, GEO. MUNRO JAQUES, of Boston, in the county of Suffolk and State of Massachusetts, have invented a new and useful combination of extracts of tobacco with saponaceous substances for the purpose of destroying insects and their eggs infesting plants and animals, and pelts or hides of animals, and removing the scab and other cutaneous diseases from sheep and other animals.

Simple decoctions of tobacco have been employed for the purpose of destroying parasitic animals, and large quantities of unmanufactured tobacco are imported into sheep-growing countries at considerable expense for freight and transportation for this purpose.

In order to save the expense of transportation and relieve the farmer from the disagreeable and tedious labor of preparing the decoction, preparations of simple tobacco in a highly-concentrated form containing all the soluble and volatile portions useful for the purpose had in view have been invented, and such a preparation is described in the patent issued to George Jaques, dated the 27th day of December, 1859.

An important objection to the preparation last referred to is, that the concentrated extract in its simple form has been refused admission in certain sheep-growing countries obtaining large revenue from duties on tobacco, on account of the facility which it affords for impregnating the leaves of common plants with the essential oils of the tobacco, by means of which imitations of the veritable leaf are fabricated and the revenue defrauded. For the purpose of overcoming this difficulty, and at the same time of preserving in a concentrated form all the volatile elements of the tobacco, I have invented the preparation or combination the mode of making which I will now proceed to describe.

For making my preparation or combination I use two methods.

In the first method, tobacco of any kind, the strongest being preferred, is placed, without any addition of water, in an iron retort. Heat is then applied and the tobacco subjected to the process known as "destructive distillation." By this process an essential oil is condensed containing all the active principles of the tobacco, such as nicotine and ammonia. I take the product of this distillation and add it to soft soap of any kind, preferring, however, whale-oil soap on account of its vermifuge properties. The effect of this combination is, that all the volatile portions of the extract of tobacco are retained by the soap, and the combination may be kept for an indefinite time and exposed to the air without deterioration. This combination of the extract of tobacco with soaps may be placed in a still and nothing will come over but water.

In my second method, which is preferred, I place tobacco of any kind, preferring the strongest, in a suitable vessel and cover it with water. I then apply heat or steam until a strong solution is formed. The contents of the vessel are then discharged and strained, and the resulting solution of tobacco is added to any soft soap, whale-oil soap being preferred for the reasons before given. All the contents of the vessel may be mixed with the soap. The whole—that is, the solution or extracts of tobacco with the soap—is concentrated by evaporation to a proper consistency, which is about that of sugar-house molasses. By this process, as in the other, all the volatile portions of the tobacco are retained by the soap.

This combination of extracts of tobacco with soaps is more efficacious for the destruction of insects and vermin infesting animals and plants than simple extracts or solutions, and all the volatile elements are permanently preserved, while no objection can be made to its introduction into such countries as refuse the admission of the simple extract, the combination with the soap preventing any objectionable use.

What I claim as my invention, and desire to secure by Letters Patent, is—

The combination of extracts, solutions, and distillations of tobacco, including the nicotine oils and ammonia and soaps, in the manner and for the purpose above described.

GEO. M. JAQUES.

Witnesses:
BYRON ROSE,
WM. BUTLER.